Aug. 28, 1962 R. P. FEDERSPIEL 3,051,508
VEHICLE SPLASH GUARD
Filed Feb. 13, 1961 2 Sheets-Sheet 1
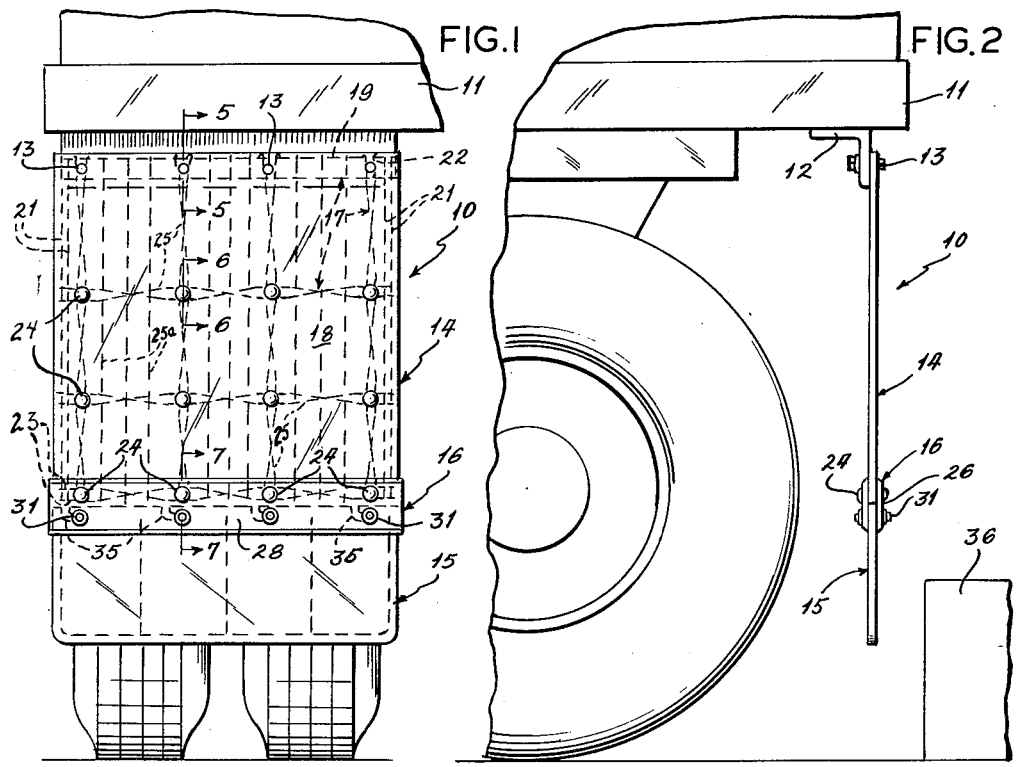
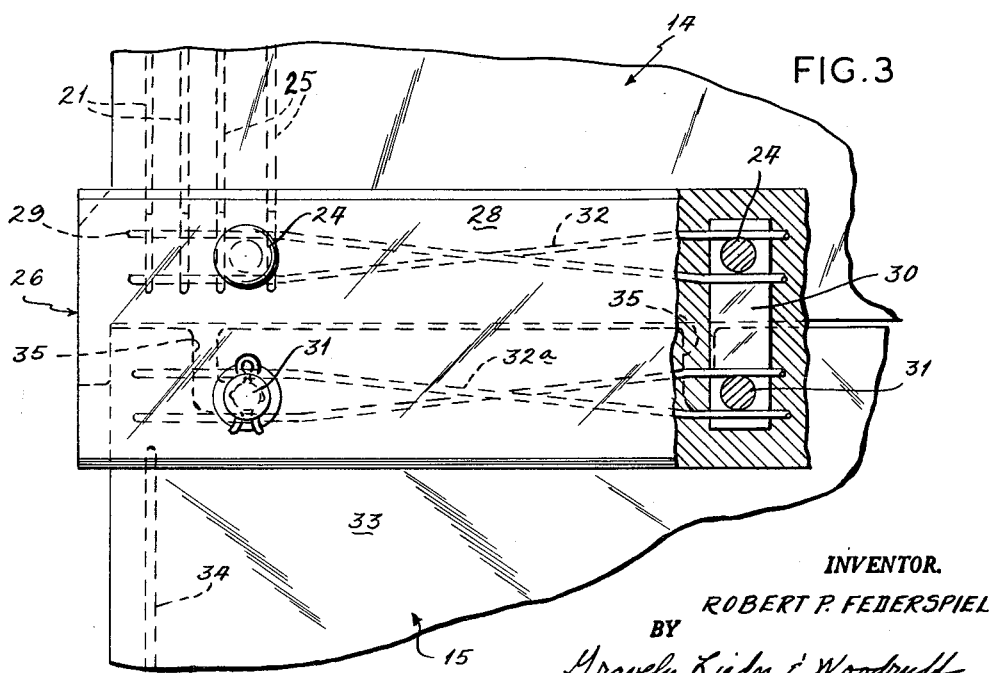
INVENTOR.
ROBERT P. FEDERSPIEL
BY
Gravely, Lieder & Woodruff
ATTORNEYS.

Aug. 28, 1962 R. P. FEDERSPIEL 3,051,508
VEHICLE SPLASH GUARD
Filed Feb. 13, 1961 2 Sheets-Sheet 2
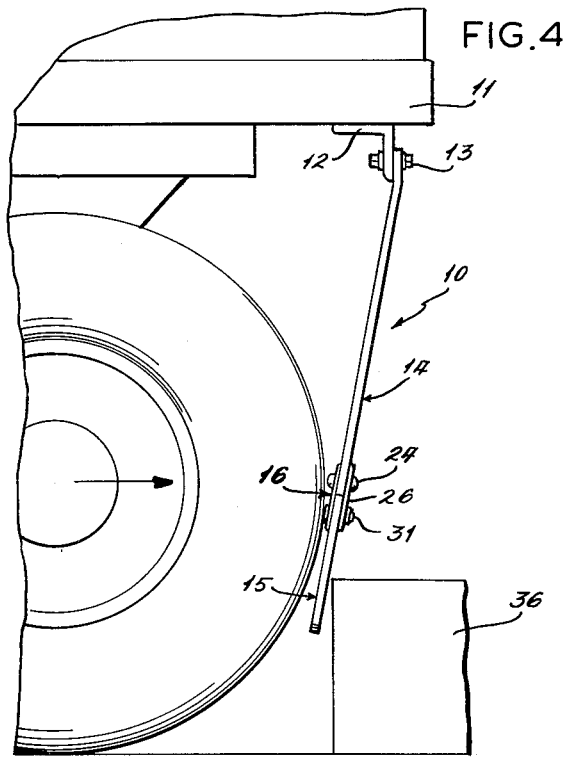
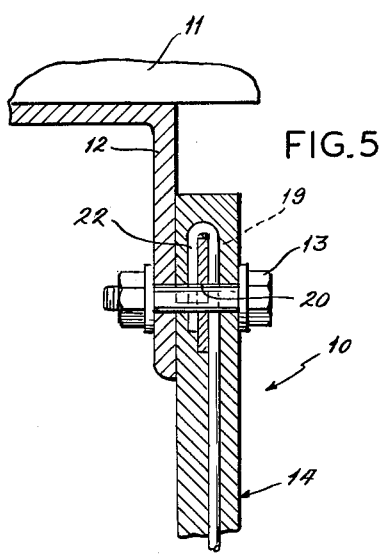
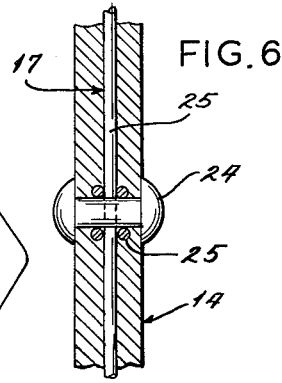
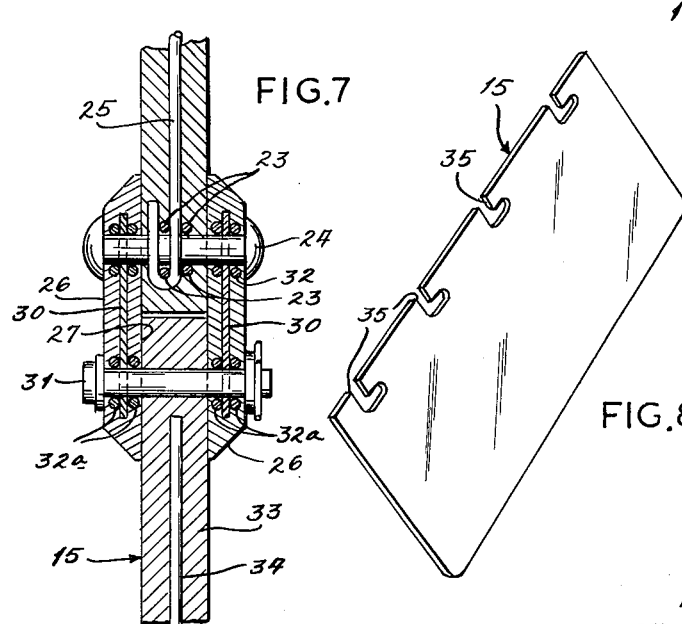
INVENTOR.
ROBERT P. FEDERSPIEL
BY
Gravely, Lieder & Woodruff
ATTORNEYS 3,051,508
VEHICLE SPLASH GUARD
Robert P. Federspiel, 6317 Hurstgreen Lane, Affton, Mo.
Filed Feb. 13, 1961, Ser. No. 88,819
4 Claims. (Cl. 280—154.5)

The present invention relates to a vehicle splash guard, and more particularly to a semi-flexible vehicle splash guard comprising a main section having a resilient deformation resistant frame covered by a tough tear resistant plastic body, and a replaceable bottom section.

Vehicle splash guards presently are used primarily on highway freight trailers having large dual wheels, the splash guard being appended at the rear of the wheels with the lower margin spaced a predetermined distance (usually about eight inches) from the ground. Splash guards are required by law in most states, and are intended to prevent debris, slush, mud, etc. from being thrown rearwardly by the wheels of the truck against following vehicles.

Present mud guards generally are formed of a sheet of rubber which is fastened to a bracket fixed on the underside of the trailer body. All metal mud guards also have been used.

Both the rubber and the all metal mud guards have various objectional characteristics which render them not entirely satisfactory. For example, the rubber guards are too flexible when the vehicle is in motion, tending to move rearwardly and upwardly to uncover the rear wheels, thus allowing debris to be thrown against the following vehicle. This action is variously described as "flapping," "sailing" and "tailgating." Metal guards tend to become bent and deformed in use, since truck drivers often are careless when positioning their vehicles against loading docks and the like. The metal guards are bent against the wheel and when the vehicle subsequently is operated, a hole is worn into the tire. In addition, the metal guards are expensive and heavy and require a mechanic to install and maintain them.

To protect the loading docks from carelessly maneuvered trucks, the dock owners customarily place a block on the ground a predetermined distance form the dock, so that the rearward movement of the trailer will be arrested and the driver alerted by the impact of the rear wheels against the block. Since a splash guard must extend within eight inches of the ground to be effective, and the stop block must be at least ten or twelve inches above the ground to be effective, it is apparent that at times the lower portion of the splash guard will be caught between the rear wheel and the block. If the guard is not flexible, it will be bent and have to be replaced. If the guard is flexible, it often is torn, and must be replaced. Even if the flexible guard is only nicked or a small portion torn off, the damaged area is weakened and the excessive flapping of the guard in use greatly increases its rate of deterioration.

Also, some states recently have contemplated legislation which would require the use of splash guards which do not move more than 20° from the vertical when the vehicle is operated at the maximum legal speed limit. The splash guard provided by the present invention fulfills this requirement, whereas all presently used flexible guards sometimes move 45° from the vertical when subjected to normal highway conditions.

To obviate the foregoing difficulties, the present invention provides a splash guard including a resilient main section and an inexpensive replaceable lower section. It is an object of the present invention to provide a vehicle splash guard which is limitedly deformable, but which does not allow excessive rearward movement when the vehicle is in motion.

It is another object of this invention to provide a vehicle guard which can be attached to a vehicle without the use of any special brackets or tools. It is another object to provide a vehicle guard which has a relatively permanent main body portion and a lighter inexpensive removable lower portion which can be replaced if damaged.

It is a further object of the present invention to provide a flexible mud guard in which the end most removed from the under side of the vehicle does not move more than 20° from the vertical when subjected to normal highway conditions at the maximum legal speed limit of the vehicle.

These and other objects and advantages of the present invention will become apparent hereinafter.

The present invention comprises a vehicle splash guard having a main body section with reinforcing stiffening members running therethrough, a secondary lower section which is easily replaceable, and means for attaching the sections together.

In the drawings:

FIG. 1 is a fragmentary end elevational view of the present invention attached to a vehicle with the vehicle partially broken away, FIG. 2 is a partially broken side elevational view of the present invention attached to a vehicle, FIG. 3 is a greatly enlarged partially broken view of the engagement between the main section and the lower section, FIG. 4 is a broken side elevational view similar to FIG. 2 but showing the vehicle moved against a stop block, FIG. 5 is a broken sectional view taken along the line 5—5 of FIG. 1, FIG. 6 is a broken sectional view taken along the line 6—6 of FIG. 1, FIG. 7 is a broken sectional view taken along the line 7—7 of FIG. 1, and FIG. 8 is a perspective view of the replaceable lower section.

FIG. 1 shows a vehicle splash guard 10 attached to a vehicle 11. A bracket 12 is fastened to the underside of the vehicle 11 and the splash guard 10 depends from the vehicle 11 and is fastened to the bracket 12 by fastening means such as bolts 13 (FIG. 5). The vehicle splash guard 10 comprises a main body section 14, a lower replaceable tear off section 15 and fastening means 16 for removably positioning the sections 14 and 15 together.

The main section 14 includes a reinforcing structure 17 (indicated by the broken lines in FIG. 1) contained within and covered by a solid body 18 of a tough, deformable, tear resistant plastic composition such as rubber or a compound of rubber. The structure 17 preferably is metal which is treated so that it joins strongly with and is firmly bonded within the plastic body 18.

The main section 14 is made by placing the structure 17 between two sheets of rubber 18 and curing the rubber with heat and pressure to tenaciously bond it to the metal frame 17 and to form the sheets into a single mass or body 18.

The structure 17 includes a top plate 19, preferably formed of heavy gauge steel, at the upper margin thereof. The plate 19 is provided with openings 20 which receive the bolts 13 fastening the guard 10 to the vehicle 11. At the outer extremities of the metal plate 19 are outer longitudinal frame members 21 having a U-shaped end 22 which engages the top of the plate 19. The lower ends of the outer frame member 21 engage a transverse reinforcing frame member 23 to define the lower margin of the frame 17.

Spaced throughout the first section 14 are anchor members such as rivets 24 which are vertically aligned with the fastening bolts 13 fastening the first member 14 to the bracket 12. The outside longitudinal frame members 21 are positioned outwardly of the longitudinal rows of rivets 24, and the lower transverse frame 23 is formed of two pairs of wire members which engage the lowermost transverse row of rivets 24. Each of said frame wire members 23 cross between the rivets 24 and alternately pass over and under each successive rivet 24. Spaced longitudinally and transversely through the body of the first section 14 are pairs of wire stringers 25, each of which bears against and is aligned with several of the rivets 24 (FIG. 6). The stringers 25 are constructed and arranged to cross between the rivets 24 and to provide mutual bearing contact between other. The frame members 21 and 23 and the stringers 25 are under tension from being interwoven and laced around the rivets 24. Intermediate longitudinal stringers 25a engage the top frame 19 and the bottom frame 23 between the intermediate stringers 25 and are alternately laced over and under the transverse stringers 25.

The interwoven network of the frame members 21 and 23, the stringers 25 and 25a and the top reinforcing plate 19 combined with the tough reboundable outer covering 18 provides the first member 14 with a degree of flexibility, but also gives it a unique, necessary characteristic ability to return to its original shape when temporarily deformed by an external force.

The wire frame and stringer members 21, 23, 25 and 25a preferably are a heavy (16) gauge tempered spring steel of great tensile strength, but a material which is comparatively flexible and has the characteristic of immediate resistance to a force tending to deform it from its formed shape and the ability to resist these deforming forces and return to its formed shape a great number of times is suitable. The wire members are mechanically straightened and thus tend to return to their formed shape when subjected to a deforming force.

The frame and stringer members 21, 23, 25 and 25a are laced about the anchor rivets 24 longitudinally and transversely to provide metal to metal bearing contact. The longitudinal stringers 25a which are intermediate the longitudinal series of rivets 24 are passed over and/or under the transverse stringers 25 to provide additional points wherein the frame members are restrained and confined in their original arrangement.

In addition to providing the necessary resiliency and strength, the bonding of the structure 17 to the body 18 retards the progression of small tears and cuts which may occur in the rubber body 18.

Furthermore, the rivets 24 provide a series of hinge points for the structure 17 wherein the body of the rivet acts as a mechanical axis for those frame and stringer members 21, 23 and 25 which radiate therefrom. The heads of the rivets 24 bear against the outer surface of the rubber body 18 and positively confine the members of the structure 17 in their prearranged position within the body 18 (FIG. 6).

The interlaced and meshed series of stringers and rivets tend to provide a series of short moment arms which strongly resist external forces.

A pair of connecting sections 26 are positioned on either side of the first member 14 overlapping the lower edge thereof. The connecting members 26 extend downwardly from the lower margin of the first member 14 and define a pocket 27 between their inner surfaces and the lower margin of the first member 14 (FIG. 7). The pocket 27 is adapted to receive and retain the replaceable bottom member 15.

The members 26 include a plastic body 28, preferably rubber, with a stiffening frame 29 therein. The frame 29 includes rectangular plates 30 engaged by the transverse series of rivets 24 which engage the transverse frame members 23 in the main section 14. The plates 30 depend downwardly from the rivets 24 longitudinally through the members 26 to engage removable fastening means 31, such as bolts and snap rings, at the lower edges of the members 26. Transverse frame members 32 (corresponding to the lower transverse frame members 23) and 32a engage the rivets 24 and the bolts 31 in both of the connecting sections 26. The removable fastening means 31 passes through the pocket 27.

The replaceable section 15 includes a plastic body 33, preferably rubber, and may include a wire reinforcing member 34 around the sides and the bottom edge thereof. The top margin is provided with a series of L-shaped openings 35 aligned with the snap bolt fastening means 31.

The replaceable section 15 is fastened to the main section 14 by engaging the L-shaped slots 35 with the bolts 31 in the pocket 27. The upper margin of the replaceable section 15 is adjacent to the lower margin of the main section 14 and the section 15 is housed between the inner surfaces of the connecting sections 26.

Thus when the lower section is damaged or torn it can easily be replaced by the truck driver merely by sliding the old section 15 out of engagement with the fastening means 16 and sliding the new section 15 into the pocket 27. The vehicle operator does not need any special tools or other equipment to replace the section 15. The upper or main body section 14 is relatively long lasting and needs replacement only when it is worn out and can be replaced in the normal scheduled maintenance of the truck.

FIGS. 3 and 4 show the situation which normally occurs when a vehicle backs up to a loading dock (not shown) and engages a stop block 36 which is placed in front of the dock to warn the driver before the truck engages the dock. If the splash guard is continuous, the lower edge often is torn and necessitates replacement of the entire guard. However, with the present invention, the replaceable section 15 takes all of the normal wear and if severely damaged, can be easily and inexpensively replaced.

The cuts and nicks started in the edges of the splash guards are greatly accelerated by excessive "flapping," whereas the limited (20° or less) movement from the vertical of the present splash guard greatly diminishes the tendency of any cuts to spread through the guard.

Thus it is apparent that the present invention provides a splash guard which achieves all of the objects and advantages shown therefor.

This invention is intended to cover all changes and modifications of the examples of the invention herein chosen for purposes of the disclosure, which do not constitute departures from the spirit and scope of the invention.

What is claimed is:

1. A vehicle splash guard comprising a main section having top, bottom and side edges, a frame extending around the outer periphery of the main section spaced from the edges thereof, longitudinal stringers connecting the top and bottom frame members, transverse stringers connecting the side frame members, said longitudinal and transverse stringers crossing with mutual bearing contact therebetween to define a series of hinge points, rivets positioned at the stringer intersections to securely position said stringers, a plastic body covering said frame, said frame being bonded to said body, said rivet heads being positioned on the surface of said body, a replaceable end section, and means at the bottom edge of said main section to engage said replaceable end section.

2. A vehicle splash guard comprising a main section having top, bottom and side edges, a metal frame for said main section comprising a bar adjacent to the top edge, a transverse member adjacent to the bottom edge, longitudinal members adjacent to the side edges and in engagement with the bar and transverse member, anchor members cooperatively positioned in said bar, in said transverse member and intermediate thereof, main metallic longitudinal and transverse stringers in metal to metal bearing contact around said anchor members, and secondary longitudinal stringers engaged with said bar and said transverse member, said longitudinal and transverse stringers and frame members being mechanically straightened heavy gauge tempered spring steel characterized by its resistance to deformation and tendency to return to its original shape, said anchor members in said bar being engageable with a vehicle to fasten the splash guard to said vehicle, a tough rubbery tear-resistant plastic overlay covering said frame members, a replaceable end section, and means cooperating with said anchor members of said transverse frame member to engage said replaceable end section with said main section.

3. A vehicle splash guard comprising a main section having top, bottom and side edges, an internal structure for said main section including longitudinal and transverse members interlaced around restraining members, said longitudinal and transverse members being heavy gauge tempered spring steel resistant to deformation, means for fastening said guard at its top edge to a vehicle, a tough rubbery material bonded to and covering said internal structure, means adjacent to the bottom edge of the main section for attaching a replaceable section including spaced apart joiner sections fastened to the main section and extending beyond the bottom edge thereof to define a U-shaped housing and removable fastening means through said housing, and a replaceable section having top, bottom and side edges, a frame in said replaceable section spaced from the bottom and side edges, intermediate longitudinal frame members, and a body portion of a tough rubbery material covering said frame, said body portion being provided with L-shaped slots at the top edge thereof, said slots being engageable with said removable fastening means with said top edge of the replaceable section received in the U-shaped housing of the main section.

4. A vehicle splash guard comprising a first section of a tough deformable rubber, removable fastening means through the upper end of the first section adapted to engage a vehicle, a metal plate through the interior of the first section at the upper end thereof engaged by said bolts, a transverse member through the interior of the first section at the lower end thereof, longitudinal members in the first section engaging said top plate and said transverse member, rivets through the first section at spaced intervals, the heads of said rivets engaging the outer surfaces of the first section, and transverse stringers through the interior of the first section between said top plate and said transverse member bearing against the spaced rivets and the longitudinal members, second and third sections positioned at the lower margin of the first section and overlying a portion of the outer surface thereof and defining a pocket therebetween, first means fastening the second and third sections to the first section, removable second fastening means anchored in the second and third sections and extending through the pocket defined therebetween, reinforcing means in said second and third sections including members connecting said first and second fastening means both longitudinally and transversely, and a replaceable fourth section including a strengthening frame covered by a durable rubbery material, the upper margin of said fourth section having spaced openings adapted to engage the second fastening means in the pocket defined between the inner surfaces of the second and third sections, said openings being of an L-shape whereby the fastening means are engaged in the vertical leg of the L and moved into the lateral leg to lock the fourth section to the remainder of the vehicle splash guard.

References Cited in the file of this patent
UNITED STATES PATENTS

| | | |
|---|---|---|
| 2,252,537 | Wilson | Aug. 12, 1941 |
| 2,619,363 | Wenham et al. | Nov. 25, 1952 |
| 2,683,612 | Bacino | July 13, 1954 |
| 2,699,955 | Eaves | Jan. 18, 1955 |